United States Patent [19]

Thompson

[11] 4,332,424
[45] Jun. 1, 1982

[54] LOW DISTURBANCE TRACK CLEAT AND ICE CALK STRUCTURE FOR FIRM OR ICY SNOW

[75] Inventor: James A. Thompson, Logan, Utah

[73] Assignee: De Lorean Manufacturing Company, Bloomfield Hills, Mich.

[21] Appl. No.: 94,383

[22] Filed: Nov. 15, 1979

Related U.S. Application Data

[63] Continuation of Ser. No. 892,710, Apr. 3, 1978, Pat. No. 4,218,101.

[51] Int. Cl.³ .................... B62D 55/24; B62D 55/28
[52] U.S. Cl. ................................. 305/35 EB; 305/54
[58] Field of Search ............... 305/35 EB, 36, 37, 38, 305/54

[56] References Cited

U.S. PATENT DOCUMENTS

| | | | |
|---|---|---|---|
| 3,163,249 | 12/1964 | Ledohowski | 305/35 EB X |
| 3,558,198 | 1/1971 | Tomita | 305/35 EB |
| 3,561,825 | 2/1971 | Gibson et al. | 305/35 EB X |
| 3,787,099 | 1/1974 | Tucker et al. | 305/35 EB X |
| 3,829,174 | 8/1974 | Thomas | 305/35 EB |
| 3,830,551 | 8/1974 | Masaoka et al. | 305/35 EB |

Primary Examiner—David A. Scherbel
Attorney, Agent, or Firm—A. Ray Osburn

[57] ABSTRACT

An endless crawler track for a tracked vehicle, having particular utility in applications where snow to be traversed by the vehicle is hard or icy, includes low disturbance track cleats that are spaced three to five inches apart and are bolted crosswise to the belting of the track. The cleats are characterized by having a generally triangular oval cross section so that as the belting travels upward from the rear wheel around the drive sprocket at the rear of the vehicle, each cleat emerges from the imprint made in the snow without chunking and flinging of snow. The track features a novel ice calk attached to every third or fourth track cleat for preventing sideways sliding of the vehicle on ice.

3 Claims, 6 Drawing Figures

LOW DISTURBANCE TRACK CLEAT AND ICE CALK STRUCTURE FOR FIRM OR ICY SNOW

RELATED APPLICATIONS

This application is a continuing application based on co-pending application Ser. No. 892,710; filed Apr. 3, 1978; Inventor, James A. Thompson, now U.S. Pat. No. 4,218,101.

BACKGROUND OF THE INVENTION

1. Field of the Invention

This invention relates to an improvement in crawler or endless tracks of track-laying vehicles that are used on snow and ice, and in particular, to a track cleat and ice calk structure having special utility where the snow is firm or icy and it is desired to minimize disturbance to the snow and to prevent sliding sideways while providing satisfactory traction.

2. Description of the Prior Art

Many different forms of traction cleat elements for use on crawler or endless tracks for over-snow work vehicles have been proposed in the prior art. Typical forms of such traction cleat elements that have long been used commercially are shown in U.S. Pat. No. 3,165,364, granted on Jan. 12, 1965. The track cleat elements there disclosed have provided a smooth-riding self-cleaning endless track that has been further characterized by the inclusion of provisions for concentrating wear on a central replaceable wear plate during operation on hard road and ground surfaces, and for the attachment of an extended traction device for use in deep snow.

A problem with the prior art track cleat elements, particularly when the track-laying vehicle is used on firm or icy snow, is their tendency upon egress from the imprint made in the snow, to chunking and flinging of sections of snow thereby undesirably disturbing the snow, and their further tendency to sideways slipping on ice.

SUMMARY OF THE INVENTION

Among the objects of the invention is the provision of a low-disturbance track cleat and ice calk structure for the endless tracks of over-snow work vehicles that is particularly useful on firm or icy snow and that avoids the above-mentioned problems of the prior art.

Another object of the invention is the provision of an improved structure for supporting a replaceable ice calk for a vehicle crawler track, which structure includes a sleeve means that releasably supports the ice calk with respect to the track.

A further object of the invention is the provision of an improved crawler track for work vehicles having particular utility on firm or icy snow that includes first and second sets of track cleat elements, alternate ones of said first and second sets of track cleat elements being laterally disposed with respect to each other on said track, and further includes a plurality of ice calks that are attached to selected ones of each of said first and second sets of track cleat elements to minimize sideways slipping of the track on ice.

In accomplishing these and other objects there is provided according to the invention an endless crawler track for over-snow track-laying vehicles having particular utility where snow to be traversed by the vehicle is firm or icy. The endless crawler track includes elongated low disturbance track cleat elements that are spaced three to five inches apart and bolted crosswise to the belting of the track, alternate cleats being laterally displaced from each other on the belting. Each such track cleat is characterized by having a generally triangulated oval cross section shape except for a small triangular area behind a biting edge of the cleat. With track cleat elements so formed, as the belting travels upward from the rear wheel and around the drive sprocket at the rear of the vehicle, the track cleat elements egress from the imprint made in the snow without chunking and flinging sections of snow. The biting edge of the cleat provides good traction under hard snow or icy conditions. In order to prevent sliding of the track sideways on ice, an ice calk is attached to every third or fourth cleat, the ice calks desirably being distributed on opposite sides of the track. Each ice calk is held in a sleeve or socket which is welded to an associated cleat element, being releasably retained in the sleeve by a "C" ring that is provided to facilitate replacement of the ice calk when worn. For improved wear, each ice calk desirably is equipped with a tungsten carbide tip.

BRIEF DESCRIPTION OF THE DRAWINGS

A better understanding of the present invention may be had from the following detailed description when read in connection with the accompanying drawings wherein.

Figure 1:
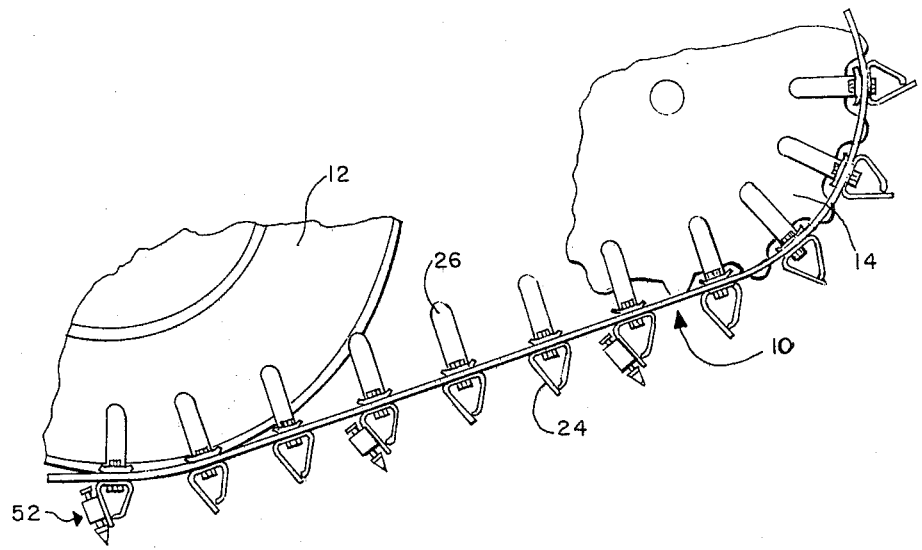
FIG. 1 is a fragmentary side view of an endless track for a track-laying vehicle, according to the invention, in meshing engagement with a driving sprocket and with a guiding tired wheel, and illustrating the low disturbance cleats and ice calk structure secured thereto.

The novel features of the track cleat element and ice calk structure of the present invention are illustrated in the accompanying drawings in combination with the belting of a crawler or endless belt track, generally designated 10, of a track-laying vehicle, not shown, but which is provided with aligned ground or track engaging tired wheels, one of which is shown at 12 in FIG. 1, and wherein the track is driven from a powered sprocket wheel such as the wheel 14. It will be understood that the track-laying vehicle is provided with two endless belt tracks 10, one disposed on either side of the vehicle. The belting may be made of any suitable material in accordance with conventional practice in the art such, for example, as rubber, steel or fabric reinforced, neoprene, etc.

Figure 2:
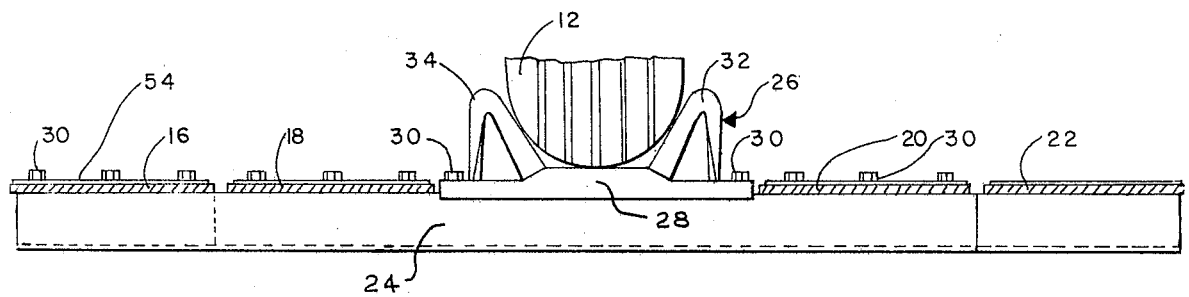
FIG. 2 is a transverse cross section of the endless track and of the guiding wheel of FIG. 1 taken along the lines 2—2 of FIG. 3.
Figure 3:
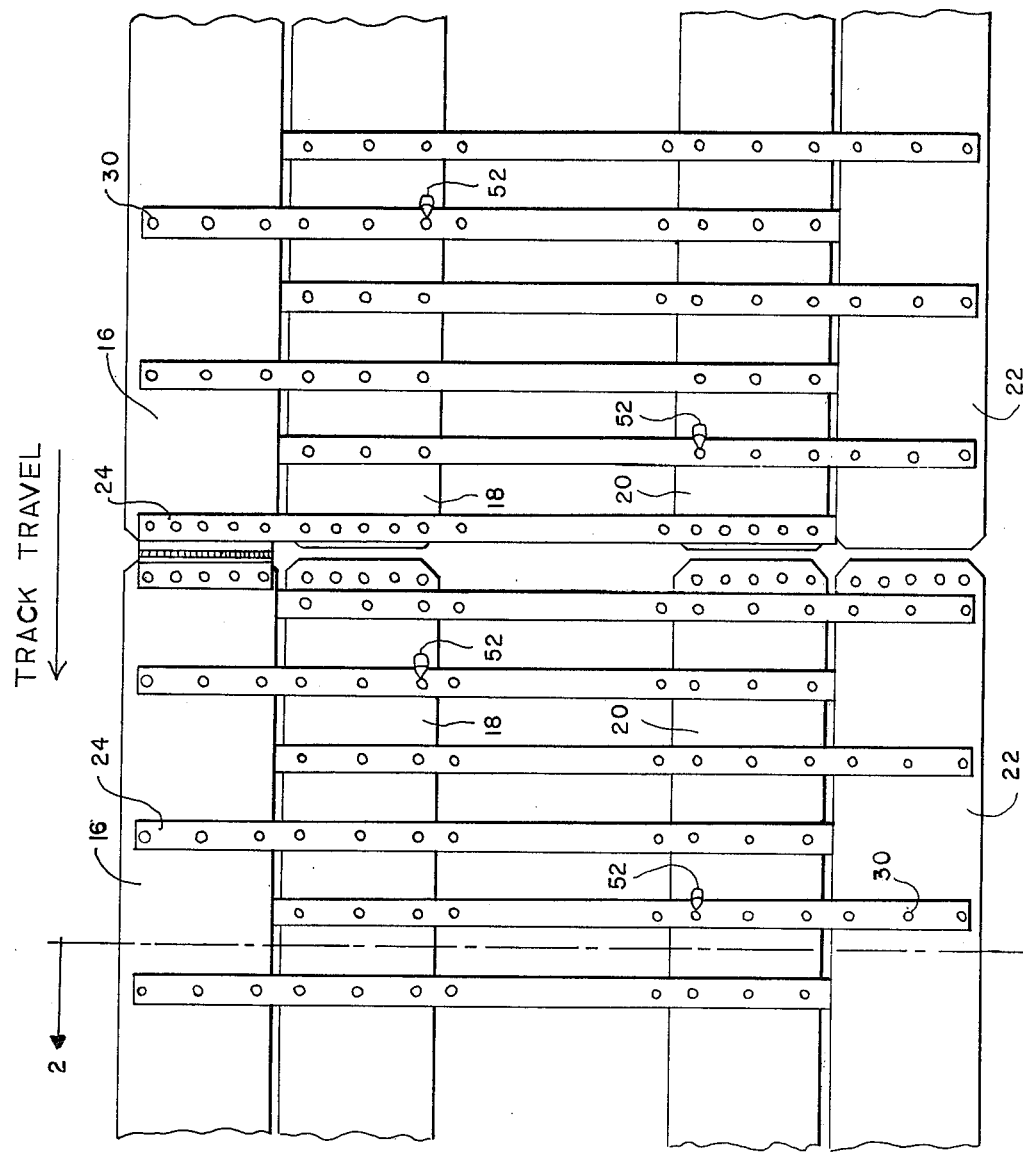
FIG. 3 is a partial plan view of the endless track illustrating the bolting of the traction cleats to the belting of the track and the location of the ice calks along the track, wheel guides being omitted.

As is shown in FIGS. 2 and 3, each endless track 10 comprises two pairs of identical endless flexible belts indicated at 16 and 18, 20 and 22, the belts of each pair being in closely spaced relation. The pairs of belts 16 and 18, 20 and 22 are arranged in side by side, spaced relationship, one pair of belts on each side of the frontto-rear aligned row of tired wheels 12. The pairs of belts are interconnected by a plurality of elongated steel track cleat elements 24. As seen in FIG. 3, particularly, the length of each track cleat element 24 is shorter than the span of the entire width of the two pairs of belts 16 and 18, 20 and 22 by the width of one of the outer belts 16 or 22. The cleat elements 24 are distributed in evenly spaced, staggered relation, along the endless belts 16 and 18, 20 and 22 being suitably attached thereto by a plurality of self locking cap screws as illustrated and described further hereinafter by reference to FIG. 5. The spacing of the cleat elements 24 desirably is at intervals of 3 inches or 5 inches, for example, such that the cleat elements 24 generally coincide and register with the powered sprocket wheel 14 and other conventional idler sprocket wheels that may be provided on track-laying vehicle.

Each track cleat element 24, as illustrated in FIG. 2, comprises several components including a wheel guiding member 26 for tired wheel 12, which member 26 is attached to the cleat element 24. Each member 26 is formed of a central sprocket engaging channel section 28 that is attached to the adjacent inner surface of the cleat 24, being wrapped around the opposite side surfaces thereof for a short distance. The length of the section 28 is such as substantially to span the distance between the belts 18 and 20 of the pairs of belts. Section 28 is held to the cleat element 24 by self locking cap screws indicated at 30.

Each tired wheel guiding member 26 further includes a pair of opposed tired wheel guiding portions 32 and 34 that are formed from a length of channel section into a generally inverted V-shaped configuration with the extended ends of the legs thereof being welded to the central portion 28.

Figure 4:
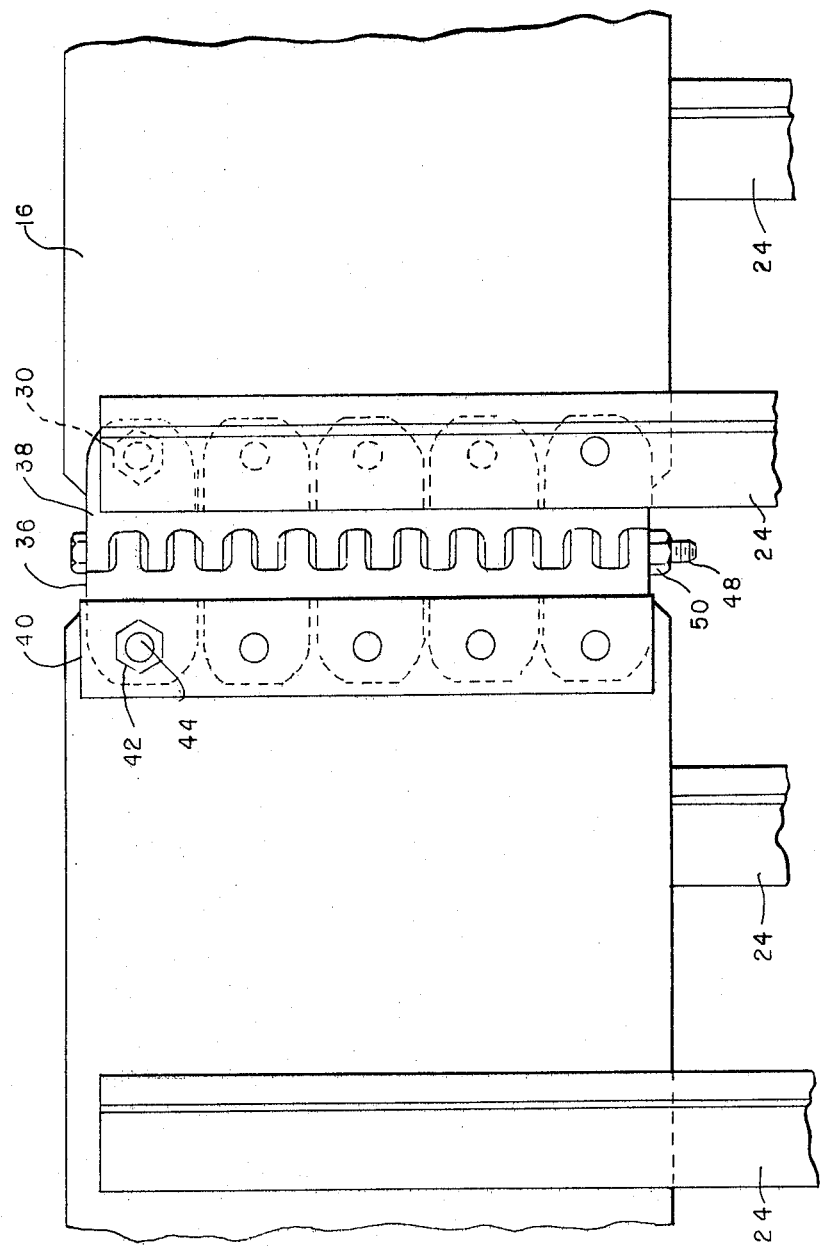
FIG. 4 is a partial plan view of one of the belts of the endless track illustrating the lacing of the ends of each belt together.

The manner in which the adjacent ends of the endless belts 16 and 18, 20 and 22 are attached or coupled to each other is illustrated in FIG. 4. FIG. 4 shows the manner of attachment of the ends of a single belt, the belt 16 being selected for purposes of illustration. As there is shown, belt lacings 36 and 38 are attached to the left and right ends, respectively, of the belt 16. Specifically, the left end of belt 16 is clamped between the belt lacing 36 and a lacing back plate 40 by five hex head cap screws 44 and associated nuts 42, only one of each being shown in FIG. 4. Similarly, the right end of belt 16 is clamped between the belt lacing 38 and the adjacent cleat element 24 by a plurality of self locking cap screws such as that indicated at 30 by dotted lines in FIG. 4 but illustrated in detail in FIG. 5. The belt lacings 36 and 38 are brought into cooperate coupling relation and an elongated hex head cap screw or bolt 48 is inserted in the aligned openings to effect the desired coupling, the screw 48 being retained in position by a nut 50.

The attachment or coupling of the ends of the other belts 18, 20 and 22 to each other may be effected in a similar manner. As previously noted, the track cleat elements 24 do not extend across the full width of the track. Thus, in FIG. 3 the cleat element 24 referred to in connection with FIG. 4 is seen to terminate short of the belt 22. Accordingly, a lacing back plate similar to the plate 40 is employed in association with a belt lacing 38 to clamp the right end of the belt 22 therebetween for coupling the ends of the belt 22 together, the left end of the belt being clamped between a belt lacing 36 and lacing back plate 40 as described in connection with FIG. 4.

As seen in FIG. 3 alternate ones of the track cleat elements 24, for convenience designated first track cleat elements, are attached to the belts 16, 18 and 20 and the remainder of the cleat elements, designated second track cleat elements, are attached to the belts 18, 20 and 22. This staggered relation of the first and second track cleat elements 24 on the belting provides a desired flexibility to the outer belts 16 and 22 and also provides a desired strength and stability to the inner belts 18 and 20 which are closer in position to the track engaging wheels 12 and sprocket wheel 14.

In accordance with the invention there is attached to every third or fourth traction cleat element 24 an ice calk assembly 52 for preventing the endless track 10 from slipping sideways on ice, the ice calk assembly being shown in FIG. 3 as attached to alternate ones of each of the first and second track cleat elements and positioned, respectively, adjacent the belts 18 and 20. The ice calk assembly 52 and the structure of the track cleat elements 24 together with the manner of attachment thereof to each other and to the endless belt track 10 are described by reference to FIG. 5, which shows a cross section of a track cleat element 24 attached to the belt 18, the direction of vehicle travel being indicated by the arrow.

Figure 5:
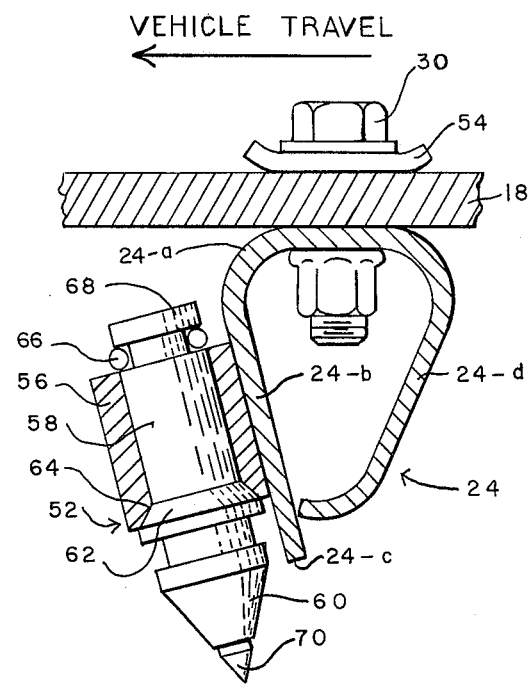
FIG. 5 shows a cross section of the traction cleat and ice calk structure according to the invention.
Figure 6:
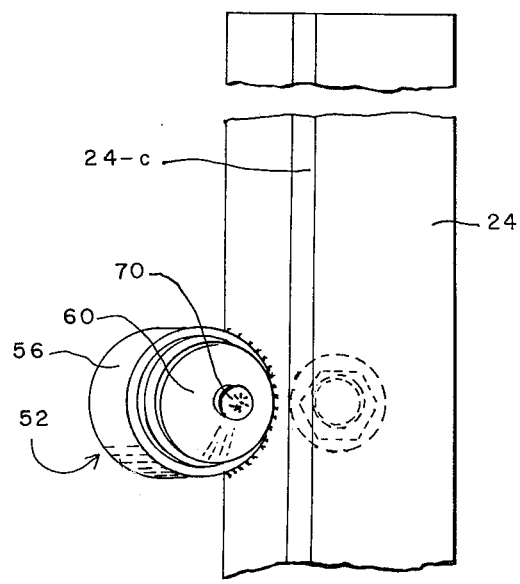
FIG. 6 is a fragmentary bottom plan view of the traction cleat and ice calk structure.

The cross section of each track cleat element 24, as shown in FIG. 5, is an inverted generally triangulated oval, the cleat element being formed from a suitable steel plate. Each track cleat element in cross section includes a base portion 24-a, a leading portion 24-b including a biting edge 24-c and a trailing side 24-d. The attachment of the track cleat element to the belt 18 is by means of a self locking cap screw 30 and a backing plate 54, the belt 18 being clamped between the plate 54 and the element 24. The biting edge 24-c is provided by curling the edge of the trailing portion 24-d toward the leading portion 24-a. With this shape of each of the track cleat elements 24, as the endless belt track 10 travels upward from the rear wheel and around the drive sprocket at the rear of the track-laying vehicle, it will egress from the imprint made in the snow without chunking and flinging sections of snow. The biting edge 24-c is desirable for good traction under hard snow or icy conditions.

Each ice calk assembly 52 includes a sleeve or socket 56 and an ice calk 58 formed of hardened steel. The sleeve 56 is welded to the leading portion 24-b of the track cleat element 24, being positioned transversely thereto. The ice calk 58 is cylindrically shaped and is provided with a cone shaped pointed end 60, being inserted in the sleeve 56 with the pointed end 60 facing in the same direction but extending beyond the end of the biting edge 24-c of the cleat element 24. The ice calk 58 is retained in the sleeve 56 by an enlarged beveled edge 62 of the ice calk 58, which edge mates with a beveled edge 64 formed in the associated end of the sleeve 56, and by a removable "C" ring 66 that engages a groove 68 adjacent the end of the ice calk 56 remote from the pointed end 60. As a result, a worn ice calk 56 may readily be removed by removing the "C" ring, and quickly replaced. For improved wear, each ice calk 58 desirably is equipped with a tungsten carbide tip indicated at 70.

Thus, there has been provided according to the present invention an endless crawler track for over-snow track-laying vehicles that is particularly useful where snow to be traversed by the vehicle is hard or icy and where a minimum disturbance to the snow is desired.

The invention features a track cleat element and ice calk structure that provides satisfactory traction while at the same time minimizing chunking or flinging of sections of snow and preventing slipping on ice.

What is claimed is:

1. In a tracked vehicle for traveling upon snow, comprising at least one endless belt crawler track longitudinally disposed to the vehicle, at least one endless belt track engaging guide wheel disposed rearwardly on the vehicle, and at least one endless belt drive wheel disposed upwardly of said guide wheel, the endless belt being withdrawn from the snow beneath the guide wheels to and about the drive wheel, a plurality of elongated track cleats, each comprising:

a base side;

means attaching the base side of the track cleat to the endless crawler track belt so that the track cleat is transverse to the crawler track and the cleat extends downwardly to make an impression into the snow when the track cleat is beneath the vehicle;

a leading side downwardly extending generally from the forward end of the base side and disposed toward the forward direction of travel of the vehicle;

a trailing side downwardly extending generally from the rearward end of the base side and disposed backwardly from the forward direction of travel of the vehicle and meeting the leading side generally at the lowermost extension of the cleat, the trailing side shape being in cross section such that no point thereon moves rearwardly beyond the impression in the snow when the cleat is rotatably translated upwardly and forwardly out of the impression by the endless belt as the vehicle travels forwardly over the snow, said trailing side shape being such that each point thereon is located as forwardly as possible horizontally toward the means attaching the base side of the cleat to the endless crawler belt, without any of such points moving rearwardly of the impression in the snow when the cleat is withdrawn therefrom, and said trailing side shape is approximated by an upper rearwardly convex arcuate portion joining the base side, a downwardly and forwardly extending straight portion joining said upper arcuate portion, and a lower forwardly curving downwardly convex arcuate portion joining the straight portion and extending toward the leading side; and the cleat comprises a single plate member bent to provide the base side and the trailing side including the upper and lower arcuate portions thereof, and bent also to provide the leading side comprising a forwardly convex arcuate portion tangentially joining the forward end of the base side and a forwardly facing, downwardly and rearwardly extending straight portion tangentially joining said forwardly convex arcuate portion of the leading side, and a snow biting edge is provided being a downward extension of the leading side portion of the plate beyond the trailing side.

2. A vehicle crawler track, comprising endless track means; and a plurality of track cleats secured at intervals along said track means transversely thereof, each of said cleats comprising an elongated plate member extending transversely of said track means and transversely formed to provide an elongated, generally triangulated, oval, substantially closed cross section having a base and leading and trailing portions the full length of said member, the leading and trailing portions of the plate member of each cleat both including an edge, the trailing portion of said plate member being curled generally toward the leading portion thereof, and the lowermost extension of said trailing portion being curled sharply to meet the leading portion substantially normal thereto, the edge of said leading portion extending further from the base portion of said plate member than the edge of the trailing portion thereof.

3. In a tracked vehicle for traveling upon snow, comprising at least one endless belt crawler track longitudinally disposed to the vehicle, at least one endless belt track engaging guide wheel disposed rearwardly on the vehicle, and at least one endless belt drive wheel disposed rearwardly and upwardly of said guide wheel, the endless belt being withdrawn from the snow beneath the guide wheels to and about the drive wheel, a plurality of elongated track cleats, each comprising:

means attaching the base side of the track cleat to the endless crawler track belt so that the track cleat is transverse to the crawler track and the cleat extends downwardly to make an impression into the snow when the track cleat is beneath the vehicle; and a single plate member bent to provide a base side, a leading side extending downwardly and rearwardly from the forward end of the base side and disposed toward the forward direction of travel of the vehicle, and a trailing side downwardly extending generally from the rearward end of the base side and disposed backwardly from the forward direction of travel of the vehicle and meeting the leading side near but slightly above the lowermost extension of the cleat, the trailing side shape being in cross section a continuous contour such that no point thereon moves rearwardly beyond the impression in the snow when the cleat is rotatably translated upwardly and forwardly out of the impression by the endless belt as the vehicle travels forwardly over the snow, the continuous contour of the trailing side being approximated by an upper rearwardly convex arcuate portion joining the base side, a downwardly and forwardly extending straight portion joining said upper arcuate portion, and a lower forwardly curving downwardly convex arcuate portion joining the straight portion and extending to the leading side normally thereto and slightly above the lowermost edge thereof.

* * * * *